United States Patent [19]
Jacobson

[11] 3,739,451
[45] June 19, 1973

[54] MULTIPLE-BOLT INSTALLATION JIG
[76] Inventor: Roger Jacobson, 1200 Ocean Dock Road, Anchorage, Alaska 99502
[22] Filed: Sept. 29, 1972
[21] Appl. No.: 293,593

[52] U.S. Cl............... 29/237, 29/157 R, 29/200 J, 285/27
[51] Int. Cl............................................ B23p 19/04
[58] Field of Search .................... 29/157 R, 200 P, 29/237, 200 H, 200 J; 81/13; 269/49, 52; 285/27, 412; 287/129

[56] References Cited
UNITED STATES PATENTS
2,963,090   12/1960   Cole ................................. 285/27 X
2,517,391    8/1950   Ernestus ............................. 285/27
2,872,228    2/1959   Anderson ........................... 287/129
3,290,763   12/1966   Zahuranec ......................... 29/237
3,566,507    3/1971   Jacobsen ........................... 29/200 P
3,620,554   11/1971   Ward ................................ 29/157 R Primary Examiner—Robert C. Riordon
Assistant Examiner—J. C. Peters
Attorney—Philip Hoffman

[57] ABSTRACT

A jig comprising a frame with a plurality of bolts rigidly affixed therein and extending longitudinally therefrom parallel to one another is shown. The jig is mounted on a flanged pipe with the bolts seated in holes in the flange. The frame is then moved forward along the pipe to simultaneously install the bolts into holes in a flange of an abutting pipe.

15 Claims, 11 Drawing Figures

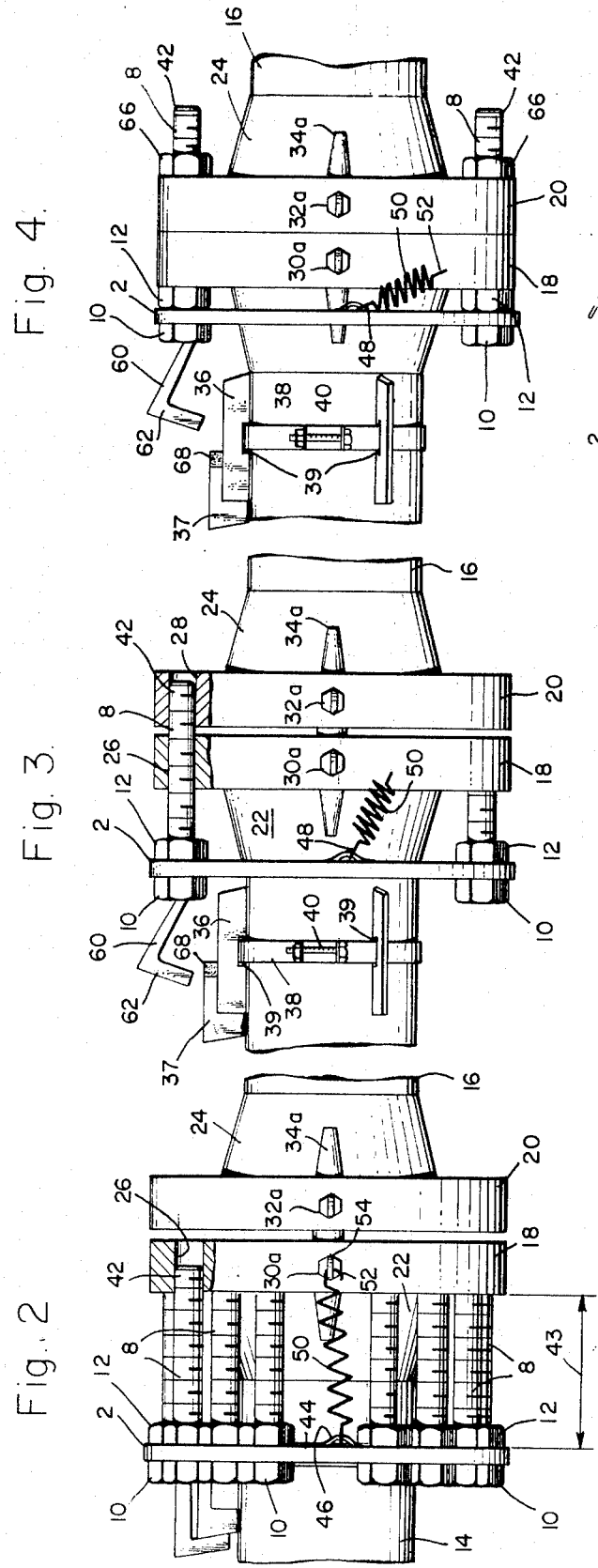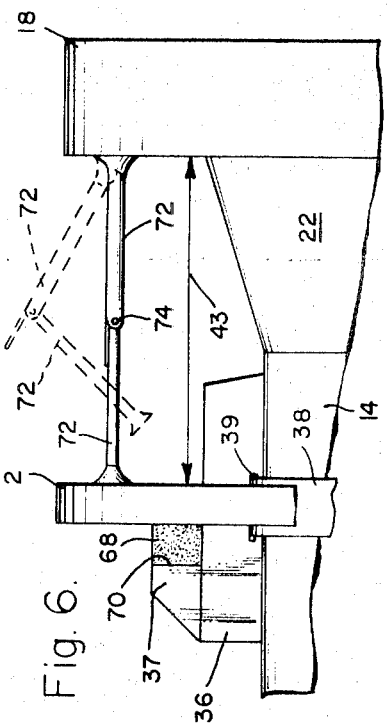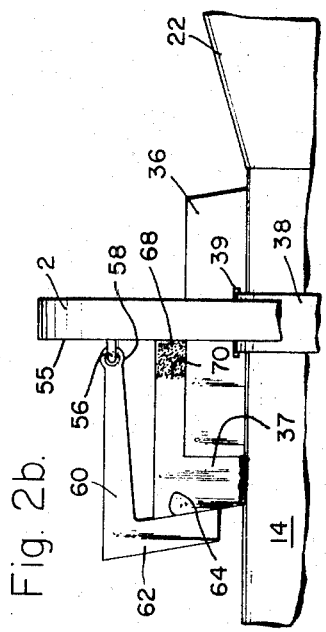

MULTIPLE-BOLT INSTALLATION JIG

This invention relates to bolted flange couplings in general, and more specifically to a device for coupling two abutting flanges by simultaneously projecting a plurality of bolts through aligned coupling holes in the abutting flanges. The invention has particular relevance to pipe flange coupling as well as coupling of other flanged members.

The use of bolts to couple flanged structural members is well known. The coupling process generally entails aligning the members so that the flanges abut one another with their bolt holes aligned to accommodate the bolts. After insertion, the bolts are secured by nuts at either end. This coupling process is familiar to the construction industry and is used extensively throughout the world. For example, in the construction of oil, gas or water pipelines, pipe sections are coupled together by abutting a flanged end of one pipe section against the flanged end of another and inserting bolts in holes in both flanges.

Presently, when a coupling involves a plurality of bolts, each bolt is individually inserted in the holes of both flanges. This is very costly from the standpoint of time and labor expended. For example, in the case of an oil pipeline 48 inches in diameter and requiring perhaps 50 bolts per flanged coupling where each bolt is 2 inches in diameter, 20 inches long and weighs 20 pounds each, the time to install one bolt might average 5 minutes or more. This means the time to complete one coupling might be 5 hours or more and require 2 or 3 men. If the pipeline is being installed in northern Canada or Alaska where temperatures of 50° below zero are common, the time to complete one coupling will take longer, thereby increasing the cost. In the event an arctic storm arises before the coupling can be completed, an entire crew would have to sit idle until the storm passed.

When pipelines are being laid underwater, the coupling process involves additional difficulties, such as muddy water where the worker cannot see what is doing and must, therefore, feel his way. This extends the time involved. In Alaska where the tidal waves rise as high as 35 feet, the available working time in the water is 30 minutes out of every 6 hours when the tide is at the end of an ebb or flow and is reversing direction. Only then is the water calm enough to work in. In the case of the aforementioned 50 bolt coupling, it might take three divers a total of 6 hours underwater to complete the coupling. This means 12 dives would be required, and at the rate of 1 dive every 6 hours, the total time elapsed before completion would be 3 days. In between dives a crew of engineers, divers and maintenance men are sitting virtually idle, along with a barge and associated equipment which might cost as much as 5 million dollars.

It would be desirable to be able to simultaneously seat a plurality of bolts or other coupling members through the holes in abutting flanges of adjacent pipe sections. This would reduce the amount of time it takes to complete such couplings and, therefore, would reduce the amount of money spent in building pipelines. It would also reduce the hazardous time a workman spends underwater or under extremely cold conditions.

One solution might be to mount the various bolts in the flange of one pipe, then align the other pipe so that the holes in its flange accommodates the bolts. Indeed, this is a well known procedure in the manufacture of electronic wafer switches wherein the wafers are stacked onto two screws extending from the first wafer. Both screws impale each wafer in turn simultaneously. This method is also used in mounting engines in automobiles, where permanent studs extend upwards from the block. The engine is lowered so that it is impaled by all the studs at one time.

This solution presents difficulties, however, in pipeline construction and repair. If the bolts were mounted in one flange first, they would protrude from the end of the pipe and be prone to having their threads damaged or to being broken off in the process of aligning the two abutting pipes. Furthermore, the alignment itself would take perhaps as much time as seating each bolt separately, because each bolt must still fit one hole in the abutting flange, and if they were not all parallel, each bolt would have to be adjusted to fit in its designated hole. If one bolt were misaligned, which could happen because of the floating ends, it could not advance past the abutting flange and therefore it would prevent the seating of the other bolts because the advancement of the flange would thereby be impeded.

An insurmountable difficulty arises from this method when a section of an existing pipeline must be replaced. The new pipe section, with its longitudinally extending bolts, would not be able to fit laterally into the space vacated by the old pipe section. Therefore, this method of preseating the bolts in one of the abutting flanges does not, in fact, solve the aforementioned problems associated with coupling abutting flanges. Another solution is required.

Accordingly, it is an object of this invention to provide a method for quickly and simultaneously seating a plurality of bolts through the bolt holes in abutting flanges of adjacent pipe sections.

It is another object of the present invention to provide a multiple-bolt seating device suitable for coupling flanged pipe sections underwater.

A further object of this invention is to provide a multiple-bolt seating mechanism for coupling a flanged member to another body.

These and other objects and advantages of the present invention are accomplished by a device fo simultaneously installing a plurality of coupling members which are seated in coupling holes of a flange of a first body into aligned coupling holes of an abutting body and for simultaneously removing the plurality of coupling members from the aligned coupling holes of the abutting body. The device comprises a frame which is movably mountable on the first body and has a plurality of coupling holes therethrough. The first body could be a flanged pipe section or a flanged beam, for example. A plurality of coupling members, such as bolts or rivets, are rigidly secured at one end in the holes in the frame and extend longitudinally therefrom parallel to one another. The coupling members are alignable with and seatable in the coupling holes in the flange when the frame is mounted one the first body. The frame is movable along a direction parallel to the longitudinal axes of the coupling members. Associated with the frame may be a retaining mechanism, such as a retaining pawl, which releasably retains the frame from moving when motion of the frame is undesired. Also associated with the frame may be a moving mechanism, such as a spring, which moves the frame toward the flange, thereby installing the coupling members into the aligned holes of the abutting body.

The invention will be described in greater detail in conjunction with the drawings in which:

FIGS. 2, 3 and 4 are elevational views of the frame and coupling members in three progressive stages of employment;

FIG. 2b is a detail view of the retaining pawl of FIG. 2;

FIG. 6 is a detail drawing of another retaining mechanism;

Figure 1:
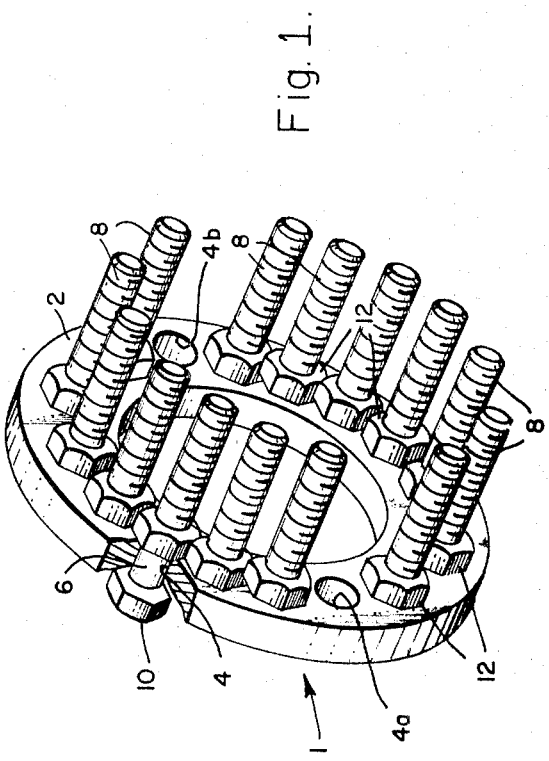
FIG. 1 is a perspective view of the frame and coupling members according to one embodiment of this invention.

Referring now to the perspective drawing of FIG. 1, there is shown a multiple-bolt launching jig 1 comprising an annular frame 2 having a series of circumferentially spaced holes 4 therethrough. Two holes 4a and 4b, located at diametrically opposite ends of the frame 2, at essentially 3 o'clock and 9 o'clocl, respectively, are slightly larger than the other holes 4 for reasons which will become clear subsequently. Seated in each hole 4, other than holes 4a and 4b, is an end 6 of a threaded bolt 8 which is secured therein by the bolt head 10 and nut 12, respectively. The bolt heads 10 and nuts 12 prevent the bolts 8 from moving backward or forward of the frame 2. The bolts 8 all extend forward perpendicularly from the frame 2 and, therefore, parallel to one another. The bolts 8 could be secured to the frame 2 in any other manner as well, such as by welding, so long as they are parallel to one another and perpendicular to the frame 2 as shown.

Figure 2A:
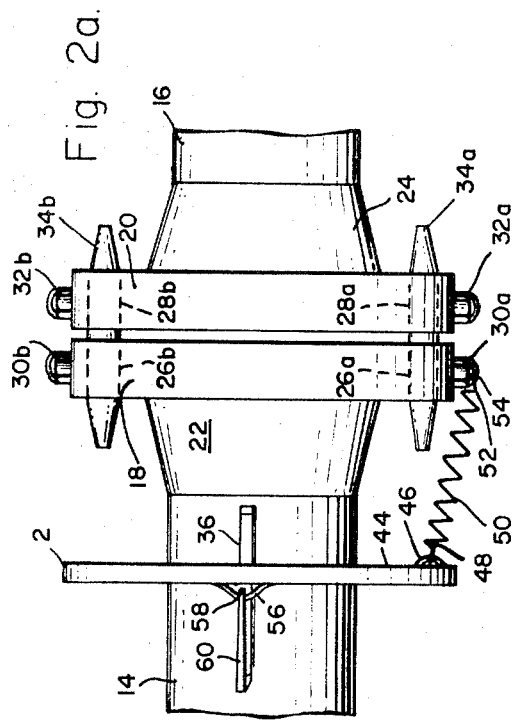
FIG. 2a is a top view of FIG. 2 without the bolts.

In FIGS. 2 and 2a are shown the end portions of two adjacent and longitudinally aligned pipe sections 14 and 16 which terminate in essentially identical abutting flanges 18 and 20, respectively. The bolts 8 have been left out of FIG. 2a, which is a top view of FIG. 2, for purposes of greater clarity. The flanges 18 and 20 are strengthened by the tapered flange supports 22 and 24, respectively, which extend from the back of the flanges 18 and 20 partially along the pipes 14 and 16, respectively. Each flange 18 and 20 has associated therewith a series of circumferentially spaced bolt holes 26 and 28, respectively, and a pair of indexing nuts or screw heads 30 (a and b) and 32 (a and b), respectively, as shown in FIG. 2a. The indexing nuts 30a and 30b are disposed on the perimeter of the flange 18 at essentially 3 o'clock and 9 o'clock, respectively, and indexing nuts 32a and 32b are similarly disposed on flange 20. Holes 26a and 26b are located next to nuts 30a and 30b, respectively, and holes 28a and 28b are located next to nuts 32a and 32b, respectively. The flanges 18 and 20 are shown positioned with indexing nuts 30 aligned with nuts 32 so that the bolt holes 26 and 28 are, in turn, aligned to permit the coupling of the flanges 18 and 20 with bolts 8. Securing the flanges 18 and 20 in this aligned position are two holding pins 34a and 34b shown positioned as follows: Pin 34a extends through holes 26a and 28a, and pin 34b extends through holes 26b and 28b.

Other methods of securing the flanges 18 and 20 in this aligned position which are otherwise compatible with this invention are satisfactory. If another such method were to be used wherein pins 34 could be dispensed with, such as a hook and clasp arrangement, for example, on the perimeters of the flanges, each of the holes 4a and 4b on the frame 2 could have a bolt 8 seated therein, just like the other holes 4. Furthermore, in such case holes 4a and 4b would be the same size as the other holes 4.

Three guide strips 36 with stops 37 at the back thereof are disposed longitudinally along the pipe 14 and are symmetrically spaced circumferentially thereabout. These strips 36 can be welded onto the pipe 14 or they can be secured thereto by an adjustable clamping band 38 (see FIG. 3), which is threaded through slots 39 in the strips 36 and which can be tightened by a screw 40. The stops 37 are preferably rigidly fixed to the pipe 14 as by welding, for example, and can be an integral part of the strips 36, particularly when the latter are welded to the pipe 14. The purpose of these guide strips 36 will become clear subsequently.

Mounted on the pipe 14 is the jig 1 of FIG. 1, with the floating ends 42 of the bolts 8 partially seated in holes 26 in the flange 18. The stops 37 are provided to prevent the frame 2 from moving further back along the pipe 14 and thereby to keep the ends 42 of the bolts 8 seated in the holes 26 without protruding therefrom. Accordingly, the stops 37 should be located on the pipe 14 at a distance 43 from the flange 18 such that distance 43 is less than the length of the bolts 8 (not including the bolt head 10) by an amount smaller than the thickness of the flange 18. It is not absolutely essential to include stops 37, however, it is desirable. Attached to the front 44 of the frame 2 is a first loop 46 to which is attached one end 48 of a spring 50 whose free end 52 releasably engages the indexing nut 30a on flange 18. The nut 30a preferably has a looped head 54 to accommodate the free end 52 of the spring 50. Attached to the back 55 of the frame 2 is a second loop 56 to which is swivelably attached one end 58 of a retaining pawl 60 whose hook-shaped free end 62 releasably engages a pawl seat 64 disposed on the pipe 14 behind the frame 2. A detail drawing of the retaining pawl 60, seat 64, and second loop 56 is shown in FIG. 2b wherein the seat 64 comprises the back of the stop 37. When the end 62 of the pawl 60 engages the seat 64, the bolts 8 are restrained from protruding beyond the flange 18.

The jig 1 is used as follows: When a pipeline is either being newly constructed or is being repaired by replacing old pipe sections, new pipe sections, with jigs 1 primed as shown in FIG. 2, are fitted and coupled in place. In the case of a new pipeline, each new pipe section 14 is laid adjacent the last pipe section 16 with its flange 18 abutting the flange 20 of the pipe section 16. As previously mentioned, the indexing nuts 30 and 32 on the abutting flanges 18 and 20, respectively, are oriented to admit bolts 8 therethrough unimpeded. At this point the two holding pins 34a and 34b, which are tapered for easy insertion, are inserted in the aforementioned two diametrically opposite holes 28a and 28b, respectively, in flange 20 and through the complimentary holes 26a and 26b, respectively, in flange 18, thereby holding the flanges 18 and 20 in the aligned position.

The retaining pawl 60 is now released by forcing the end 62 from the seat 64, and the frame 2 is pulled forward by the tension in the spring 50 toward the flange 18, causing all the bolts 8 to simultaneously penetrate the holes 28 in the flange 20, as shown in FIG. 3. Thereafter, the frame 2 is moved forward until the bolts 8 are entirely seated. The bolts 8 are then secured with nuts 66 on the floating ends 42, as shown in FIG. 4. Because the bolts 8 are rigidly secured to the frame 2, the nuts 66 can be tightened on the bolts 8 without the use of a back-up wrench. The purpose of the guide strips 36 are better understood in light of the foregoing. Because of the thickness of the flange support 22, the inner diameter of the frame 2 must be sufficiently larger than the outer diameter of the pipe 14 so that the frame 2 can fit over the support 22 when it is brought close to the flange 18. The guide strips 36 are provided to take up the slack between the pipe 14 and the frame 2, thereby allowing the frame 2 to ride thereon along the pipe 14 without cocking the bolts 8. If the support 22 is not used, the guide strips 36 may be dispensed with, and the inner diameter of the frame 2 reduced to fit the outer diameter of the pipe section 14.

The spring 50 may be dispensed with and the frame 2 moved manually, if desired, or it may be replaced by a mechanism which moves the frame 2 hydraulically, pneumatically, electrically or any other way compatible with the invention. Such a mechanism could be operated by remote control and could even be designed to perform the function of the retaining pawl 60 and seat 64 as well.

Figure 5:
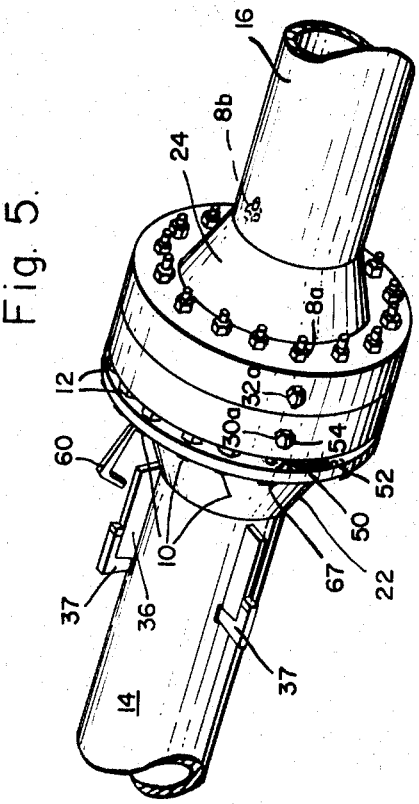
FIG. 5 is a perspective view of a completed coupling using the device of this invention according to one embodiment thereof.

The holding pins 34 are now removed and replaced by additional bolts 8a and 8b which are secured in holes 4a and 4b, respectively, with nuts 66, thereby completing the coupling. Bolt heads 67 on bolts 8a and 8b are longer than bolt heads 10 and extend from the frame 2 through the holes 4a or 4b so that bolts 8a and 8b can be torqued easily from behind the frame 2. The perspective drawing of FIG. 5 shows the two flanges 18 and 20 after the coupling is completed.

When a flanged pipe section is to be replaced, the nuts 66 are unscrewed, the bolts 8a and 8b are removed, and the jig 1 on the pipe section 14 which is to be replaced is retracted until the bolts 8 attached thereto are no longer seated in the holes 28 in the flange 20 of the adjacent pipe section 16. One flanged end of the pipe section 14 is now free. This process is repeated for the other end, with the additional process of priming the jig on the adjacent pipe section abutting that end. When a new pipe section is positioned, its jig 1 will seat the bolts 8 in the flange 20 of the adjacent pipe section at one end thereof. The jig on the pipe section adjacent the other end of the new pipe section is primed in order to seat the bolts in the flange of the new pipe section at this other end.

The jig is primed as follows: As the frame 2 is drawn back from the flanges, the spring 50 is replaced in position so that its free end 48 re-engages the looped head 54 of the nut 30a. The frame 2 is then pulled back to the stop 37, thereby creating the desired tension in the spring 50. The stop 37 prevents the bolts 8 from coming out of the holes 26 in the flange 18 when the frame 2 is retracted, as heretofore mentioned. A layer 68 of compressible material, such as rubber, for example, is disposed on the front surface 70 of the stop 37 facing the frame 2. When the frame 2 is drawn back, it compresses the layer 68 so that the free end 62 of the retaining pawl 60 can engage the hook 64.

The old pipe section 14 is now removed and replaced. If it is to be discarded there is no need to prime the jig 1 associated with it. The new pipe section is now positioned between the adjacent pipe sections and coupled thereto at either end in the manner heretofore described.

While the seat 64 is shown as the back portion of the stop 37, it may also be a separate structure rigidly affixed to the pipe section 14, if desired. Indeed, the entire retaining mechanism may be other than shown, so long as it prevents the bolts 8 from protruding forward of the flange 18, and so long as it is otherwise compatible with the invention. One such device, for example, shown in FIG. 6, comprises a pair of arms 72 hinged to one another by a locking hinge 74 such that in the open position the arms 72 are locked in an essentially longitudinally aligned fashion to separate the frame 2 from the flange 18. When the hinge 74 is released from this locked position by folding the arms 72, the frame 2 is thereby allowed to move toward the flange 18. The hinge can be released in any convenient conventional manner consistent with the invention, such as manually, as can the retaining pawl 60.

While it is preferable to have a retaining mechanism such as the pawl 60 or the arms 72, it is not essential. It is particularly preferable, however, when a pipe section is being replaced in a pipeline, although the frame 2 could be retained manually. Slight protrusion of the bolts 8 may be tolerable in most situations, however substantial protrusion is not.

Figure 7:
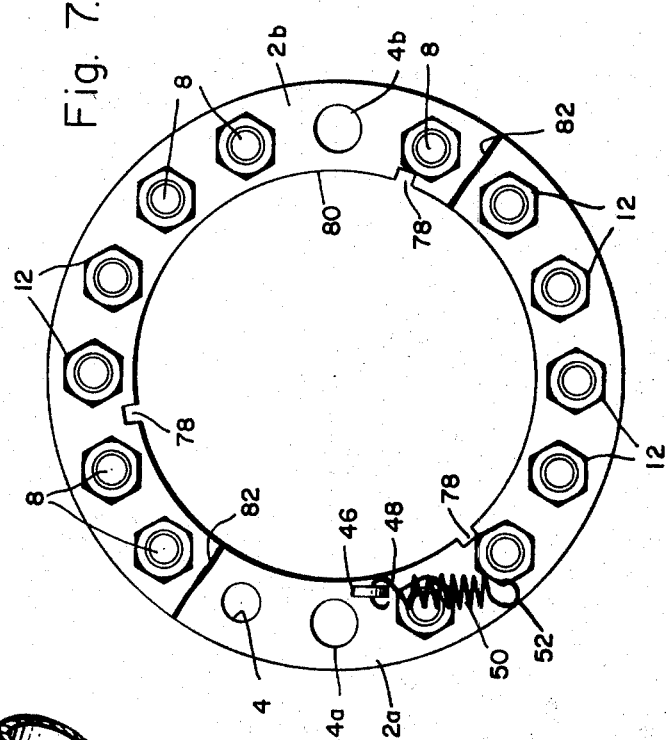
FIG. 7 is an end view of the frame according to one embodiment of this invention.
Figure 7A:
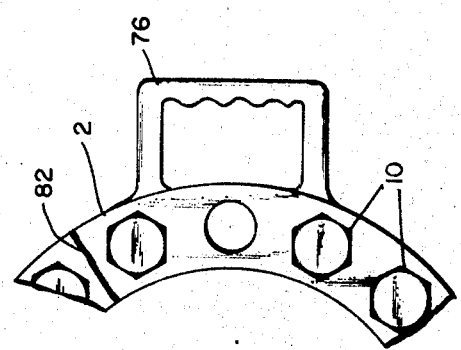
FIG. 7a is an alternative version of the frame shown in FIG. 7.

An end view of the frame 2 is shown in FIG. 7. Hand grip 76, shown in FIG. 7a, may be provided to facilitate pulling the frame 2 manually along the pipe section 14, particularly if it is desired to dispense with the spring 50. Notches 78 are cut at symmetrically spaced points about the inner surface 80 of the frame 2 to accommodate the guide strips 36, thereby preventing the frame 2 from twisting on the pipe 14. The frame 2 can be constructed in one piece and mounted on the pipe section 14 before the flange 18 is affixed thereto, or it may comprise a pair of semi-circular pieces 2a and 2b which can be fitted around an existing flanged pipe section 14. In the latter case, the pieces 2a and 2b may be welded at their ends 82 as in FIG. 7 or otherwise conventionally coupled together, such as with a hinge and clasp, to fit around the pipe 14 in a manner consistent with the invention herein disclosed.

Figure 8:
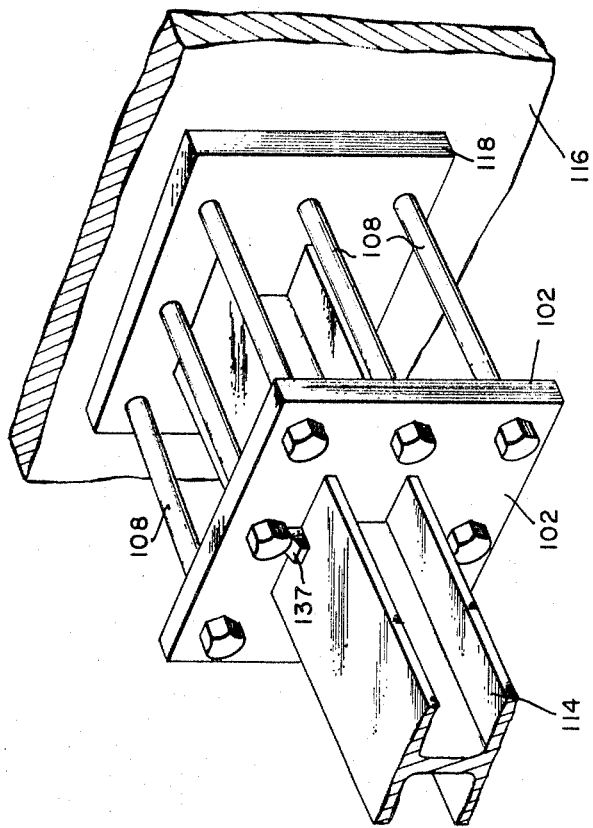
FIG. 8 is a perspective view of the frame and coupling members mounted on a structural member according to another embodiment of this invention.

While the jig 1 shown in FIG. 1 is designed to fit on a pipe, it could as well be designed for use on structural members of various other shapes. For example, in FIG. 8 there is shown another jig 101 whose frame 102 fits an I-beam 114. The flange 118 of the beam 114 abuts a body 116 which may be a wall, as shown, or another I-beam to which the flange 118 is to be coupled. The coupling can be made with nutted bolts 108, as in the case of flanged pipes, or with other coupling members such as rivets, if desired, in which case the frame 102 would have such other coupling members extending therefrom instead of bolts 108.

There has thus been shown and described a jig for simultaneously installing a plurality of coupling members, which are seated in coupling holes in a flange of one body, into holes in an abutting body. Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed in a limiting sense.

What is claimed is:

1. A device for simultaneously installing a plurality of coupling members, which are seated in couplng holes of a flange of a first body, into aligned coupling holes of an abutting body, and for simultaneously removing said plurality of coupling members from said aligned coupling holes of said abutting body, comprising:
   a frame movably mountable on said first body and having a plurality of coupling holes therethrough; and
   a plurality of coupling members secured at one end in said coupling holes of said frame and extending longitudinally therefrom parallel to one another and being alignable with, and seatable in said coupling holes of said flange when said frame is mounted in said first body, said frame being movable along said first body in a direction parallel to the longitudinal axes of said coupling members.

2. A device for simultaneously installing a plurality of coupling members, which are seated in coupling holes of a flange of a first body, into aligned coupling holes of an abutting body, and for simultaneously removing said plurality of coupling members from said aligned coupling holes of said abutting body, comprising a frame having a plurality of coupling members rigidly attached thereto and extending longitudinally therefrom parallel to one another, said frame being movably mountable on said first body and movable in a direction parallel to the longitudinal axes of said coupling members, said coupling members being seated in coupling holes in said flange when said frame is mounted on said first body.

3. The device claimed in claim 2 wherein said frame has a plurality of coupling holes therethrough and said coupling members are secured at one end in said coupling holes in said frame.

4. The device claimed in claim 3 further comprising releasable retaining means associated with said frame for releasably retaining said frame when said frame is mounted on said first body.

5. The device claimed in claim 4 wherein said retaining means includes a retaining pawl swivelably attached at one end to said frame and having a hook-shaped free end which releasably engages a pawl seat on said first body when said frame is mounted on said first body.

6. The device claimed in claim 4 further comprising moving means associated with said frame for moving said frame toward said flange and installing said coupling members into said aligned holes of said abutting body.

7. The device claimed in claim 6 wherein said moving means includes a spring attached at one end to a loop affixed to said frame and having a free end which releasably engages a looped nut attached to said flange when said frame is mounted on said first body.

8. The device claimed in claim 3 wherein said first body and said abutting body include flanged pipe sections, and said coupling members include bolts.

9. The device claimed in claim 3 wherein said first body includes a flanged beam.

10. The device claimed in claim 3 wherein said coupling members include rivets.

11. The device claimed in claim 3 wherein said first body further comprises at least one stop located thereon at a distance from said flange such that when said frame is mounted on said first body between said stop and said flange and is abutting said stop, the ends of said coupling members are seated in said holes in said flange.

12. The device claimed in claim 3 wherein said frame further comprises two additional holes disposed essentially diametrically opposite one another, said additional holes being larger than said coupling holes in said frame.

13. A multiple-bolt installation jig for simultaneously installing a plurality of bolts, whose ends are seated in coupling holes in a first flange of a first pipe, into aligned coupling holes in a second flange of an abutting pipe, and for simultaneously removing said plurality of bolts from said aligned coupling holes in said second flange, comprising:
   a frame movably mountable on a flanged first pipe and having bolts rigidly secured therein, said bolts extending longitudinally therefrom parallel to one another and being alignable with and seatable in said coupling holes in said first flange when said frame is mounted on said first pipe, said frame being movable along said first pipe in a direction parallel to the longitudinal axes of said bolts; and
   a retaining pawl swivelably attached at one end to said frame and having a hook-shaped free end which releasably engages a pawl seat on said first pipe when said frame is mounted on said first pipe.

14. The jig claimed in claim 13 further comprising a spring attached at one end to a loop affixed to said frame and having a free end which releasably engages a looped nut attached to said first flange when said frame is mounted on said first pipe such that said frame is moved toward said first flange by the tension in said spring and said bolts are installed into said aligned holes of said second flange thereby upon release of said hook-shaped free end from said pawl seat.

15. The jig claimed in claim 14 wherein:
   said first pipe further comprises at least one stop located thereon at a distance from said first flange such that when said frame is mounted on said first pipe between said stop and said first flange and is abutting said stop, the ends of said bolts are seated in said holes in said first flange; and
   said frame further comprises two additional holes disposed essentially diametrically opposite one another, said additional holes being larger than said coupling holes in said frame.

* * * * *